US012718598B2

(12) United States Patent
Krivosheev

(10) Patent No.: US 12,718,598 B2
(45) Date of Patent: Aug. 25, 2026

(54) ALGORITHMIC PIPELINE AND GENERAL PRINCIPLES OF COST-EFFICIENT AUTOMATIC PLATE RECOGNITION SYSTEM FOR RESOURCE-CONSTRAINED EMBEDDED DEVICES

(71) Applicant: URBANCHAIN GROUP LIMITED, Hong Kong (HK)

(72) Inventor: Artem Krivosheev, Hong Kong (HK)

(73) Assignee: URBANCHAIN GROUP LIMITED, Hong Kong (HK)

( * ) Notice: Subject to any disclaimer, the term of this patent is extended or adjusted under 35 U.S.C. 154(b) by 593 days.

(21) Appl. No.: 18/298,286

(22) Filed: Apr. 10, 2023

(65) Prior Publication Data

US 2024/0346836 A1 Oct. 17, 2024

(51) Int. Cl.

| | |
|---|---|
| ***G06V 20/62*** | (2022.01) |
| ***G06V 10/82*** | (2022.01) |
| ***G06V 20/40*** | (2022.01) |
| ***G06V 30/148*** | (2022.01) |
| ***G06V 30/19*** | (2022.01) |

(52) U.S. Cl.

CPC ............ *G06V 20/625* (2022.01); *G06V 10/82* (2022.01); *G06V 20/41* (2022.01); *G06V 30/15* (2022.01); *G06V 30/19007* (2022.01); *G06V 30/19173* (2022.01)

(58) Field of Classification Search

CPC ...... G06V 20/625; G06V 20/41; G06V 30/15; G06V 30/19007; G06V 30/19173; G06V 10/82

See application file for complete search history.

(56) References Cited

U.S. PATENT DOCUMENTS

| | | | | |
|---|---|---|---|---|
| 2017/0262723 | A1* | 9/2017 | Kozitsky | G06V 20/62 |
| 2023/0360409 | A1* | 11/2023 | Yang | G06V 30/10 |

FOREIGN PATENT DOCUMENTS

| | | | | |
|---|---|---|---|---|
| CN | 103236167 | A * | 8/2013 | |
| CN | 105095860 | A * | 11/2015 | G06V 30/36 |
| CN | 106874907 | A * | 6/2017 | G06F 18/24 |
| CN | 113052170 | A * | 6/2021 | G06N 3/045 |

OTHER PUBLICATIONS

Stack Overflow, "What's the complete loss function used by yolov4," 2021, p. 1-3. (Year: 2021).*

Plate Recognizer, "Automatic License Plate Recognition—High Accuracy ALPR," 2018, p. 1-13. (Year: 2018).*

(Continued)

*Primary Examiner* — Emily C Terrell

*Assistant Examiner* — Daniella M. DiGuglielmo

(57) ABSTRACT

The present disclosure proposes a method for recognizing a license plate number on an image, comprising the following steps: detecting a license plate on a vehicle in an image; recognizing characters on the license plate and coordinates of the characters by a neural network, wherein the loss function of the neural network consists of classification loss, confidence loss and Complete Intersection over Union (CIOU) loss; and organizing the recognized characters based on the coordinates to form the recognized license plate number.

9 Claims, 6 Drawing Sheets

(56) References Cited

OTHER PUBLICATIONS

Salemdeeb et al., "Full depth CNN classifier for handwritten and license plate characters recognition," PeerJ Comput. Sci, 2021, p. 1-22. (Year: 2021).*
Zhu et al., Creating a Real-Time License Plate Detection and Recognition App, Nvidia Developer, 2021, p. 1-22. (Year: 2021).*
Nasim et al., "An Automated Approach for the Recognition of Bengali License Plates," 2021 International Conference on Electronics, Communications, and Information Technology (ICECIT), 2021, p. 1-4. (Year: 2021).*
Khan et al., "Automatic license plate detection and recognition framework to enhance security applications," J. Electron. Imaging 28 (1), 2019, p. 1-9. (Year: 2019).*

* cited by examiner

| # | Layer | Filters | Size | Input | Output |
|---|---|---|---|---|---|
| 0 | conv | 32 | 3 × 3/1 | 448 × 288 × 3 | 448 × 288 × 32 |
| 1 | max | | 2 × 2/2 | 448 × 288 × 32 | 224 × 144 × 32 |
| 2 | conv | 64 | 3 × 3/1 | 224 × 144 × 32 | 224 × 144 × 64 |
| 3 | max | | 2 × 2/2 | 224 × 144 × 64 | 112 × 72 × 64 |
| 4 | conv | 128 | 3 × 3/1 | 112 × 72 × 64 | 112 × 72 × 128 |
| 5 | conv | 64 | 1 × 1/1 | 112 × 72 × 128 | 112 × 72 × 64 |
| 6 | conv | 128 | 3 × 3/1 | 112 × 72 × 64 | 112 × 72 × 128 |
| 7 | max | | 2 × 2/2 | 112 × 72 × 128 | 56 × 36 × 128 |
| 8 | conv | 256 | 3 × 3/1 | 56 × 36 × 128 | 56 × 36 × 256 |
| 9 | conv | 128 | 1 × 1/1 | 56 × 36 × 256 | 56 × 36 × 128 |
| 10 | conv | 256 | 3 × 3/1 | 56 × 36 × 128 | 56 × 36 × 256 |
| 11 | max | | 2 × 2/2 | 56 × 36 × 256 | 28 × 18 × 256 |
| 12 | conv | 512 | 3 × 3/1 | 28 × 18 × 256 | 28 × 18 × 512 |
| 13 | conv | 256 | 1 × 1/1 | 28 × 18 × 512 | 28 × 18 × 256 |
| 14 | conv | 512 | 3 × 3/1 | 28 × 18 × 256 | 28 × 18 × 512 |
| 15 | conv | 256 | 1 × 1/1 | 28 × 18 × 512 | 28 × 18 × 256 |
| 16 | conv | 512 | 3 × 3/1 | 28 × 18 × 256 | 28 × 18 × 512 |
| 17 | max | | 2 × 2/2 | 28 × 18 × 512 | 14 × 9 × 512 |
| 18 | conv | 1024 | 3 × 3/1 | 14 × 9 × 512 | 14 × 9 × 1024 |
| 19 | conv | 512 | 1 × 1/1 | 14 × 9 × 1024 | 14 × 9 × 512 |
| 20 | conv | 1024 | 3 × 3/1 | 14 × 9 × 512 | 14 × 9 × 1024 |
| 21 | conv | 512 | 1 × 1/1 | 14 × 9 × 1024 | 14 × 9 × 512 |
| 22 | conv | 1024 | 3 × 3/1 | 14 × 9 × 512 | 14 × 9 × 1024 |
| 23 | conv | 1024 | 3 × 3/1 | 14 × 9 × 1024 | 14 × 9 × 1024 |
| 24 | conv | 1024 | 3 × 3/1 | 14 × 9 × 1024 | 14 × 9 × 1024 |
| 25 | route [16] | | | | |
| 26 | reorg | | /2 | 28 × 18 × 512 | 14 × 9 × 2048 |
| 27 | route [26, 24] | | | | |
| 28 | conv | 1024 | 3 × 3/1 | 14 × 9 × 3072 | 14 × 9 × 1024 |
| 29 | conv | 35 | 1 × 1/1 | 14 × 9 × 1024 | 14 × 9 × 35 |
| 30 | detection | | | | |

Figure 2

| Layer | Type | Filters | Size/Stride | Input | Output |
|---|---|---|---|---|---|
| 0 | Convolutional | 16 | 3 × 3/1 | 416 × 416 × 3 | 416 × 416 × 16 |
| 1 | Maxpool | | 2 × 2/2 | 416 × 416 × 16 | 208 × 208 × 16 |
| 2 | Convolutional | 32 | 3 × 3/1 | 208 × 208 × 16 | 208 × 208 × 32 |
| 3 | Maxpool | | 2 × 2/2 | 208 × 208 × 32 | 104 × 104 × 32 |
| 4 | Convolutional | 64 | 3 × 3/1 | 104 × 104 × 32 | 104 × 104 × 64 |
| 5 | Maxpool | | 2 × 2/2 | 104 × 104 × 64 | 52 × 52 × 64 |
| 6 | Convolutional | 128 | 3 × 3/1 | 52 × 52 × 64 | 52 × 52 × 128 |
| 7 | Maxpool | | 2 × 2/2 | 52 × 52 × 128 | 26 × 26 × 128 |
| 8 | Convolutional | 256 | 3 × 3/1 | 26 × 26 × 128 | 26 × 26 × 256 |
| 9 | Maxpool | | 2 × 2/2 | 26 × 26 × 256 | 13 × 13 × 256 |
| 10 | Convolutional | 512 | 3 × 3/1 | 13 × 13 × 256 | 13 × 13 × 512 |
| 11 | Maxpool | | 2 × 2/1 | 13 × 13 × 512 | 13 × 13 × 512 |
| 12 | Convolutional | 1024 | 3 × 3/1 | 13 × 13 × 512 | 13 × 13 × 1024 |
| 13 | Convolutional | 256 | 1 × 1/1 | 13 × 13 × 1024 | 13 × 13 × 256 |
| 14 | Convolutional | 512 | 3 × 3/1 | 13 × 13 × 256 | 13 × 13 × 512 |
| 15 | Convolutional | 255 | 1 × 1/1 | 13 × 13 × 512 | 13 × 13 × 255 |
| 16 | YOLO | | | | |
| 17 | **Route 13** | | | | |
| 18 | Convolutional | 128 | 1 × 1/1 | 13 × 13 × 256 | 13 × 13 × 128 |
| 19 | Up-sampling | | 2 × 2/1 | 13 × 13 × 128 | 26 × 26 × 128 |
| 20 | **Route 19 8** | | | | |
| 21 | Convolutional | 256 | 3 × 3/1 | 13 × 13 × 384 | 13 × 13 × 256 |
| 22 | Convolutional | 255 | 1 × 1/1 | 13 × 13 × 256 | 13 × 13 × 256 |
| 23 | YOLO | | | | |

Figure 3

| n° | Layer | Filters | Size | Input | Output |
|---|---|---|---|---|---|
| 1 | conv | 32 | 3 × 3 / 1 | 240 × 80 × 3 | 240 × 80 × 32 |
| 2 | max | | 2 × 2 / 2 | 240 × 80 × 32 | 120 × 40 × 32 |
| 3 | conv | 64 | 3 × 3 / 1 | 120 × 40 × 32 | 120 × 40 × 64 |
| 4 | max | | 2 × 2 / 2 | 120 × 40 × 64 | 60 × 20 × 64 |
| 5 | conv | 128 | 3 × 3 / 1 | 60 × 20 × 64 | 60 × 20 × 128 |
| 6 | conv | 64 | 1 × 1 / 1 | 60 × 20 × 128 | 60 × 20 × 64 |
| 7 | conv | 128 | 3 × 3 / 1 | 60 × 20 × 64 | 60 × 20 × 128 |
| 8 | max | | 2 × 2 / 2 | 60 × 20 × 128 | 30 × 10 × 128 |
| 9 | conv | 256 | 3 × 3 / 1 | 30 × 10 × 128 | 30 × 10 × 256 |
| 10 | conv | 128 | 1 × 1 / 1 | 30 × 10 × 256 | 30 × 10 × 128 |
| 11 | conv | 256 | 3 × 3 / 1 | 30 × 10 × 128 | 30 × 10 × 256 |
| 12 | conv | 512 | 3 × 3 / 1 | 30 × 10 × 256 | 30 × 10 × 512 |
| 13 | conv | 256 | 1 × 1 / 1 | 30 × 10 × 512 | 30 × 10 × 256 |
| 14 | conv | 512 | 3 × 3 / 1 | 30 × 10 × 256 | 30 × 10 × 512 |
| 15 | conv | 80 | 1 × 1 / 1 | 30 × 10 × 512 | 30 × 10 × 80 |
| 16 | detection | | | | |

Figure 4

ALGORITHMIC PIPELINE AND GENERAL PRINCIPLES OF COST-EFFICIENT AUTOMATIC PLATE RECOGNITION SYSTEM FOR RESOURCE-CONSTRAINED EMBEDDED DEVICES

TECHNICAL FIELD

The non-limiting and example embodiments of the present disclosure generally relate to the technical field of image recognition, and specifically to methods and devices for recognizing a license plate number on an image.

BACKGROUND

This section introduces aspects that may facilitate a better understanding of the disclosure. Accordingly, the statements of this section are to be read in this light and are not to be understood as admissions about what is in the prior art or what is not in the prior art.

To save human resources, it is very useful to recognize a license plate number of a vehicle on an image automatically, and the license plate number data may be used to e.g., determine which vehicles enter closed area or enforce rules of traffic code.

There are some existing approaches to recognize a license plate number on an image in the art, for example:

Document US9911055B2 discloses a methods, systems, and processor-readable media for the detection and classification of license plates. In an example embodiment, a photo of a vehicle can be captured with a photo-capturing unit. A license plate region can then be located in the captured photo of the vehicle by extracting a set of candidate regions from the photo utilizing a weak classifier. A set of candidate regions can be ranked utilizing a secondary strong classifier. The captured photo can then be classified according to a confidence driven classification based on classification criteria determined by the weak classifier and the secondary strong classifier.

Document US20170017854A1 disclose an Arabic optical character recognition method using Hidden Markov Models and decision trees, comprising: receiving an input image containing Arabic text, removing all diacritics from the input image by detecting a bounding box of each diacritic and comparing coordinates thereof to those of a bounding box of a text body, segmenting the input image into four layers, and conducting feature extraction on the segmented four layers, inputting results of feature extraction into a Hidden Markov Model thereby generating HMM models for representing each Arabic character, conducting iterative training of the HMM models until an overall likelihood criterion is satisfied, and inputting results of iterative training into a decision tree thereby predicting locations and the classes of the diacritics and producing final recognition results. The invention is capable of facilitating simple recognition of Arabic by utilizing writing feature thereof, and meanwhile featuring comparatively high recognition precision.

Document US10068146B2 discloses a detection-based segmentation-free method and system for license plate recognition. A photo of a vehicle is initially captured utilizing a photo-capturing unit. A license plate region is located in the photo of the vehicle. A set of characters can then be detected in the license plate region and a geometry correction performed based on a location of the set of characters detected in the license plate region. An operation for sweeping an OCR across the license plate region can be performed to infer characters with respect to the set of characters and locations of the characters utilizing a hidden Markov model and leveraging anchored digit/character locations.

SUMMARY

In the existing approaches, the photos of the vehicle will be sent to a backend server for the license plate recognition, which may lead to high occupation of network traffic, because the on-site device receiving the photos has no enough processing capability to process the license plate recognition. In addition, if the photos containing the images of the vehicle are taken while the vehicle is moving, and thus are blurry, the existing approaches may need to install better cameras with higher shutter speed to solve this problem, which will make the hardware deployment expensive.

One of the objects of the present disclosure is to resolve or alleviate the above problem, by proposing a solution which will be able to obtain a license plate number (which may include digits and/or letters) in real-time setting from photos taken by a typical camera, with all the required processing and associated computations performed on a low-resource IoT device (having mobile processor) with said camera connected to that device. In contrast to common approaches to build license plate recognition systems, the proposed solution takes advantage of on-board computations and does not employ transmission of video frames from the capturing device to any local or cloud server for further processing, and does not need better cameras with higher shutter speed. Hence, the proposed solution dominates the existing approaches in terms of network bandwidth and hardware cost, reducing them by an order of magnitude.

The solution of the present disclosure includes the following aspects.

A first aspect of the solution of the present disclosure provides a method for recognizing a license plate number on an image, comprising the following steps: detecting a license plate on a vehicle in an image; recognizing characters on the license plate and coordinates of the characters by a neural network, wherein the loss function of the neural network consists of classification loss, confidence loss and Complete Intersection over Union (CIoU) loss; and organizing the recognized characters based on the coordinates to form the recognized license plate number.

A second aspect of the solution of the present disclosure provides a device for recognizing a license plate number on an image, comprising: a detecting unit, for detecting a license plate on a vehicle in an image; a recognizing unit, for recognizing characters on the license plate and coordinates of the characters by a neural network, wherein the loss function of the neural network consists of classification loss, confidence loss and Complete Intersection over Union (CIOU) loss; and an organizing unit, for organizing the recognized characters based on the coordinates to form the recognized license plate number.

A third aspect of the solution of the present disclosure provides a device for recognizing a license plate number on an image, comprising: a processor; and a memory, having stored instructions that when executed by the processor cause the device to perform the method according to the first aspect.

A fourth aspect of the solution of the present disclosure provides a machine-readable medium, having stored thereon instructions, that when executed on a device cause the device to perform the method according to the first aspect.

BRIEF DESCRIPTION OF THE DRAWINGS

The above and other aspects, features, and benefits of the present disclosure will become more fully apparent from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 2 illustrates an example architecture of a neural network for detecting a vehicle;

FIG. 3 illustrates an example architecture of a neural network for detecting a license plate;

FIG. 4 illustrates an example architecture of a neural network for recognizing characters on a license plate;

DETAILED DESCRIPTION

Embodiments herein will be described more fully hereinafter with reference to the accompanying drawings. The embodiments herein may, however, be embodied in many different forms and should not be construed as limiting the scope of the appended claims.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Also, use of ordinal terms such as "first," "second," "third," etc., herein to modify an element does not by itself connote any priority, precedence, or order of one element over another or the temporal order in which acts of a method are performed, but are used merely as labels to distinguish one element having a certain name from another element having a same name (but for use of the ordinal term) to distinguish the elements.

Unless otherwise defined, all terms (including technical and scientific terms) used herein have the same meaning as commonly understood. It will be further understood that terms used herein should be interpreted as having a meaning that is consistent with their meaning in the context of this specification and the relevant art and will not be interpreted in an idealized or overly formal sense unless expressly so defined herein.

Figure 1:
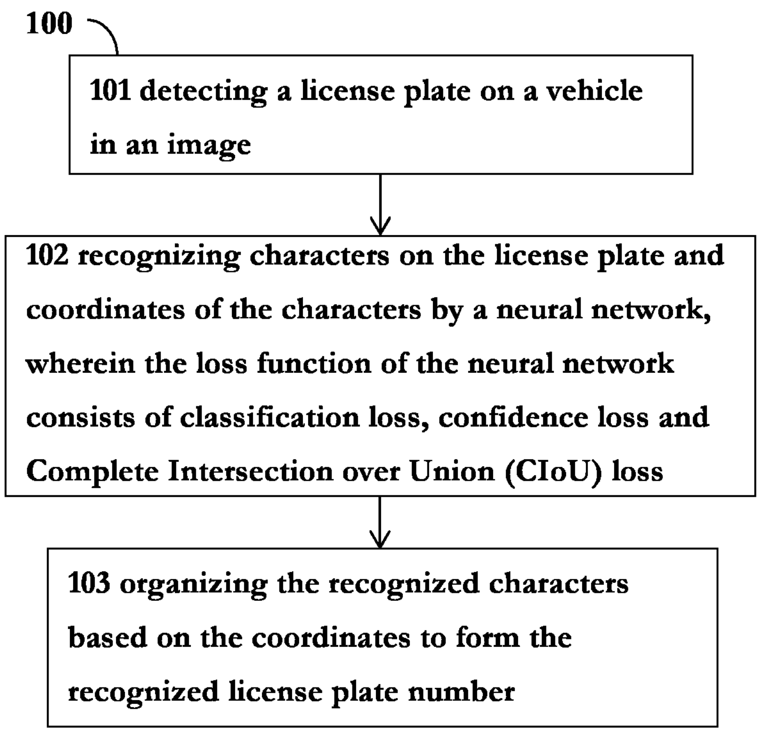
FIG. 1 illustrates a flowchart of the method for recognizing a license plate number on an image according to the present disclosure.

A flowchart of a method 100 for recognizing a license plate number on an image according to the present disclosure is shown in FIG. 1. The method 100 comprises the following steps: a step 101 of detecting a license plate on a vehicle in an image; a step 102 of recognizing characters on the license plate and coordinates of the characters by a neural network, wherein the loss function of the neural network consists of classification loss, confidence loss and Complete Intersection over Union (CIOU) loss; and a step 103 of organizing the recognized characters based on the coordinates to form the recognized license plate number.

The method according to the present disclosure may employ state-of-the-art object detectors, based on Convolutional Neural Networks (CNNs). The networks may be trained using images from several opensource datasets, as well as images that were manually collected and labeled by UrbanChain Group Limited. The computational efficiency of the method allows it to be run on wide range of resource-constrained embedded devices (also known as IoT devices), including systems-on-chip (SoC), based on ARM or Intel mobile processors, with on-board camera connected to the SoC via MIPI-CSI interface.

The amount of shared CPU-GPU RAM consumed by the proposed method is estimated to be as low as 1.5 Gb. Using innovative approaches, the method does not rely on over-the-network video transfer and does not employ any image processing on cloud servers, thus minimizing data usage, bandwidth requirements and overall cost of ownership.

Embodiments of the method according to the present disclosure will be described below, which may relate to some preprocessing and/or precondition, such as taking photos which each contains an image of a moving vehicle, and selecting one or more relatively clear photos from the taken photos. However, it can be understood that, the embodiments can be also applied without those preprocessing and precondition, for example, the image of a vehicle directly comes from a database (instead of a photo which was just taken), the vehicle is static, and/or the image itself is clear enough.

As described above, the step 101 is performed on an image of a vehicle. The image may come from e.g., a photo. For example, a plurality of photos of a moving vehicle may be taken with at least one camera, in e.g., a parking lot, wherein each photo of the plurality of photos taken with the same camera is taken in a sequential manner, in a different point of time. In an example, the plurality of photos comprises 5-10 photos. In another example, the plurality of photos may also be adjacent frames of a video regarding the vehicle. In another example, the photos are taken with two cameras connected to the same acquisition device, with each camera having a different angle of view and altitude with respect to the ground level, accounting for possible glare resulting from different angles of the vehicle's headlights, impacting the quality of the taken photos.

If some of the taken photos are blurry, it may be necessary to reduce a motion blur to be able to accurately recognize symbols on a license plate. The one solution to this problem could be a camera with high shutter speed, but such hardware could be quite expensive for deployment at scale. It is proposed to solve the problem algorithmically, e.g., by selecting one or more relatively clear photos from the plurality of photos for further processing, wherein the selection may be based on comparing at least one calculated first parameter, associated with blurriness of the photos, with a threshold. Preferably the first parameter is a variance of the photo. Preferably edge detection is performed on the plurality of photos before the first parameter is calculated. Preferably a Laplacian kernel $$(D_{xy}^2)$$

is used for edge detection.

For example, the plurality of (for example, 5 to 10) consecutive taken photos may be placed in a buffer and calculating their measures of blurriness, sliding over each photo with Laplacian kernel and then calculating the variance of the resulting matrix. The Laplacian is a 2D isotropic measure of the 2nd spatial derivative of a photo. The Laplacian of a photo highlights regions of rapid intensity change and is therefore often used for edge detection. The Laplacian L(x, y) of a photo with pixel intensity values I(x, y) is given by:

$$L(x, y) = \frac{\partial^2 I}{x^2} + \frac{\partial^2 I}{y^2} \tag{1}$$

Since the input photo is represented as a set of discrete pixels, we may find a discrete convolution kernel that can approximate the second derivatives in (1):

$$D_{xy}^2 = \begin{bmatrix} 0 & 1 & 0 \\ 1 & -4 & 1 \\ 0 & 1 & 0 \end{bmatrix} \tag{2}$$

Using kernel (2), the Laplacian can be calculated using standard convolution methods. The variation of the Laplacian could serve as a reliable photo "blurriness" characteristic and can be used for selection of the relatively clear photo(s) for further processing via proper thresholding.

Then, in an example, on each of the selected photo(s), the vehicle may be detected and a corresponding image region containing the vehicle may be cropped as the image on which the method of the present disclosure is applied, where the vehicle is detected, by means of e.g., a trained neural network with custom architecture optimized for efficient inference on low-resource devices.

An example architecture of a neural network for detecting a vehicle is shown in FIG. 2, which describes parameters and dimensions of individual layers. The input size of the photo being fed to the network was adapted to a non-square frame size (e.g., 448×288 pixels), that can be acquired from a typical camera. The network was trained on a private dataset of approximately 5000 photos collected and labeled by UrbanChain Group Limited. The photos were taken in unconstrained scenarios of road traffic and within parking lots. A range of data augmentation strategies, such as flipping, rescaling, blurring, applying cut-mix approach was used to train the network, thus preventing overfitting by creating synthetic photos with different characteristics from a single labelled photo.

In an example, after the image region containing the vehicle is cropped from the photo, the cropped image region may act as the image processed by the method according to the present disclosure. The license plate on the cropped image region of each of the selected photos may be detected, by means of e.g., a trained neural network with carefully designed architecture and dedicated for efficient inference on mobile processors. For example, a neural network for detecting a license plate, which may employ ideas from YOLOv3 paper [J. Redmon and A. Farhadi, "YOLOv3: An incremental improvement," CoRR, vol. abs/1804.02767, 2018], was trained on thousands of manually collected and labeled real-world photos and adapted to be executed in quasi-real-time on low-resource embedded devices, based on e.g., ARM chips. An example architecture of the neural network for detecting a license plate is shown in FIG. 3. The resolution of resized input images was set to e.g., 608×608 during model training, and to e.g., 416×416 during inference stage, to speed up computations on embedded platforms.

Once the license plate is detected from the image, characters on the license plate and coordinates of the characters may recognized by a neural network with e.g., the custom architecture, designed for efficient computations on low-resource devices. For fast and resource-efficient character detection in real-time, the set and order of layers, as well as the corresponding number of parameters (including convolutional filters and their sizes) in each layer of the neural network were carefully selected with the purpose of minimization of the total number of multiply-add operations involved. Said network architecture may be considered as a critical part of the proposed solution. For example, the network architecture has shown a license plate recognition accuracy of 99.7% during the field test conducted on ~2000 license plates numbers recognized from photos taken in unconstrained real-world scenario by the acquisition device both during the day and in the night.

An example layer-by-layer description of the proposed neural network architecture for recognizing the characters on the license plate is shown in FIG. 4. The associated computational costs in terms of number of multiply-add operations at each stage (i.e., layer of the neural network) are also listed on FIG. 4.

The neural network was trained to predict e.g., 35 classes ("0"-"9", "A"-"Z", where the letter "O" is detected/recognized jointly with the digit "0") and outputs a class and pixel coordinates of each recognized character. In an embodiment, the total loss function used as an optimization criterion during the process of training of the neural network consists of classification loss, confidence loss and Complete Intersection over Union (CIOU) loss and has the following form:

$$\begin{aligned} \text{LOSS} = {} & \\ & 1 - IoU + \frac{\rho^2(b, b^{gt})}{c^2} + \alpha v - \sum_{i=0}^{S^2}\sum_{j=0}^{B} I_{ij}^{obj}\left[\hat{C}_i \log(C_i) + \left(1 - \hat{C}_i\right)\log(1 - C_i)\right] - \\ & \lambda_{noobj}\sum_{i=0}^{S^2}\sum_{j=0}^{B} I_{ij}^{noobj}\left[\hat{C}_i \log(C_i) + \left(1 - \hat{C}_i\right)\log(1 - C_i)\right] - \\ & \sum_{i=0}^{S^2} I_{ij}^{obj} \sum_{c \in classes} [\hat{p}_i(c)\log(p_i(c)) + (1 - \hat{p}_i(c))\log(1 - p_i(c))] \end{aligned}$$

The above-mentioned confidence score is the output of the neural network. The M-dimensional vector of confidence scores (where M is the total number of available classes—letters and digits, in this particular example) is the slice of an initial vector of predicted parameters for each detection box, so as detection box coordinates. This initial vector is obtained following the sequence of algebraic operations, commonly employed while constructing neural networks (e.g., matrix addition, multiplication, concatenation, pooling, etc.), using the set of weights, resulting from the process of non-convex optimization of the target loss function by a kind of Stochastic Gradient Descent (SGD) algorithm, e.g., SGD with Momentum. In other words, the confidence loss is the loss in making a class prediction. In an embodiment, for a positive match prediction of a character, the confidence loss may be penalized, according to e.g., the confidence score of the class of the character; for a negative match prediction of a character, the confidence loss may be penalized, according to e.g., the confidence score of a special class: the special class classifies no object is detected, and it may be calculated as the softmax loss over confidences c of multiple classes (class score) as indicated below in (3).

$$L_{conf}(x, c) = -\sum_{i\in Pos}^{N} x_{ij}^{p}\log(\hat{c}_i^p) - \sum_{i\in Neg}\log(\hat{c}_i^o) \text{ where } \hat{c}_i^p = \frac{\exp(c_i^p)}{\sum_p \exp(c_i^p)} \quad (3)$$

where N is the number of matched default boxes (in the paradigm of Single-Shot Object Detector, which is used for building the object detector).

In addition, to minimize errors emerging at license plate characters recognition stage, various techniques may be employed, e.g., both on character- and string-level (given string representation of license plate number).

For example, non-maximum suppression may be an important process for the character recognition. There is possible to generate a plurality of detection boxes for the same single character, wherein the detection box is an area of an image which comprises all pixels of a character. Initially, all detection boxes are sorted on the basis of their confidence scores (a second parameter) calculated for each box. A detection box with the maximum confidence score is selected out and all other remaining detection boxes having a significant overlap with that detection box, determined by a third parameter, are suppressed (i.e., discarded). The third parameter is equal to area of intersection of a pair of detection boxes divided by total area covered by the pair of detection boxes. For each selected detection box, the third parameter of each pair of detection boxes involving the selected detection box and another remaining detection box is compared with a predefined threshold value. If the third parameter is higher than the predefined threshold value, said another remaining detection box is discarded. This process is recursively applied on all of the remaining detection boxes. Finally, all the detection boxes which are selected out may be used as the final detection boxes for the characters on the license plate.

In an embodiment, the detecting and recognizing steps in the method according to the present disclosure are performed on each of multiple images from adjacent frames in a video about the vehicle, and the method further comprises, for each character position: comparing characters from that position on the multiple images with each other; choosing the character which occurs most often as the recognized character on that position.

Further, to deal with incorrectly recognized number of the license plate, well-known string processing algorithms may be employed, such as Levenshtein edit distance, to filter out errors resulting from e.g., target vehicle motion blur, various occlusions and lighting issues. The Levenshtein algorithm calculates edit distance, i.e., the least number of edit operations that are necessary to modify one string to obtain another string.

Hence, in another embodiment, the detecting, recognizing and organizing steps in the method according to the present disclosure are performed on each of multiple images from adjacent frames in a video about the vehicle, to form multiple license plate numbers, and the method further comprises: assigning all license plate numbers that have low edit-distance (such as 2) from the multiple license plate numbers to a cluster; and choosing the license plate number which occurs most often in the cluster as the recognized license plate number. The resulting license plate number may be then sent to a backend server, with some additional metadata payload. This step may reduce a risk of obtaining wrong character form the image and it allows obtaining missing data from adjacent images.

The recognized characters may be placed form e.g., one-line or two-line license plate number. In an embodiment, the recognized license plate number is a two-line license plate number. In this embodiment, initially, each character may be assigned a position on a second line by default. In order to perform a reliable distribution between two lines, each character of the license plate number is compared with two preceding and two succeeding characters, calculating a difference between values of Y-coordinate of the center of the character's detection box for each pair of the corresponding characters. If the said difference exceeds 80% of the mean height (in pixels) of the character's box (calculated by taking an average of heights of all the detected character boxes), the character with the least value of the Y-coordinate is placed to the first line.

In a further embodiment, a system is proposed which comprises at least one acquisition device comprising at least one camera, a processor, a memory and a power source, and at least one server. The acquisition device is configured to perform method according to present disclosure and transfer at least the license plate number to the server. Due to high computational efficiency, it is possible to run the method on a device with a relatively low power and it is thus possible to perform most of the computations on the acquisition device. By doing this it will enable to transmit smaller data packages (the license plate number, metadata, etc., and not a series of raw photos). It will also make server significantly cheaper due to lower requirements with respect to a computation power and a memory available.

Figure 5:
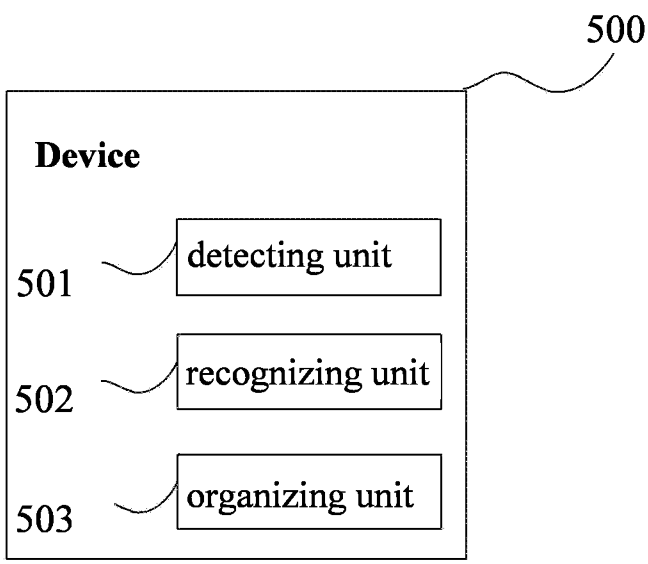
FIG. 5 is a schematic block diagram of a device according to the present disclosure.

FIG. 5 illustrates a schematic block diagram of a device 500 according to the present disclosure. The device 500 is used for recognizing a license plate number on an image, and may include: a detecting unit 501, for detecting a license plate on a vehicle in an image; a recognizing unit 502, for recognizing characters on the license plate and coordinates of the characters by a neural network, wherein the loss function of the neural network consists of classification loss, confidence loss and Complete Intersection over Union (CIoU) loss; and an organizing unit 503, for organizing the recognized characters based on the coordinates to form the recognized license plate number.

It can be appreciated that, the device 500 described herein may be implemented by various units, so that the device 500 implementing one or more functions described with the embodiments may comprise not only the units shown in the corresponding figure, but also other units for implementing one or more functions thereof. In addition, the device 500 may comprise a single unit configured to perform two or more functions, or separate units for each separate function. Moreover, the units may be implemented in hardware, firmware, software, or any combination thereof.

It is understood that blocks of the block diagrams and/or flowchart illustrations, and combinations of blocks in the block diagrams and/or flowchart illustrations, may be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

It is also to be understood that the functions/acts noted in the blocks of the flowchart may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Furthermore, the solution of the present disclosure may take the form of a computer program on a memory having computer-usable or computer-readable program code embodied in the medium for use by or in connection with an instruction execution system. In the context of this document, a memory may be any medium that may contain, store, or is adapted to communicate the program for use by or in connection with the instruction execution system, apparatus, or device.

Figure 6:
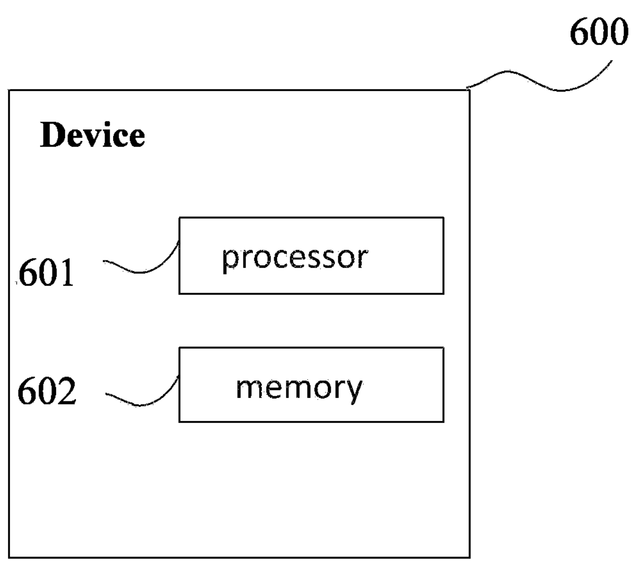
FIG. 6 is another schematic block diagram of a device according to the present disclosure.

Therefore, the present disclosure also provides a device 600 including a processor 601 and a memory 602, as shown in FIG. 6. In the device 600, the memory 602 stores instructions that when executed by the processor 601 cause the device 600 to perform the method described above with the embodiments.

The present disclosure also provides a machine-readable medium (not illustrated) having stored thereon instructions that when executed on a device cause the device to perform the method described with the above embodiments.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method for recognizing a license plate number on an image, comprising the following steps:

detecting a license plate on a vehicle in the image;

recognizing characters on the license plate and coordinates of the characters by a neural network, wherein a loss function of the neural network consists of classification loss, confidence loss and Complete Intersection over Union (CIOU) loss; and organizing the recognized characters based on the coordinates to form the recognized license plate number, wherein the detecting step, the recognizing step and the organizing step are performed on each of multiple images from adjacent frames in a video about the vehicle, to form multiple license plate numbers, and the method further comprising:

assigning all license plate numbers that have a low edit-distance from the multiple license plate numbers to a cluster; and choosing the license plate number which occurs most often in the cluster as the recognized license plate number.

2. The method of claim 1, wherein the loss function is:

$$\text{LOSS} = 1 - IoU + \frac{\rho^2(b, b^{gt})}{c^2} + \alpha v - \sum_{i=0}^{S^2}\sum_{j=0}^{B} I_{ij}^{obj}\left[\hat{C}_i \log\ (C_i) + \left(1 - \hat{C}_i\right)\log\left(1 - C_i\right)\right] - \lambda_{noobj}\sum_{i=0}^{S^2}\sum_{j=0}^{B} I_{ij}^{obj}\left[\hat{C}_i \log(C_i) + \left(1 - \hat{C}_i\right)\log\left(1 - C_i\right)\right] - \sum_{i=0}^{S^2} I_{ij}^{obj} \sum_{c\epsilon classes}\left[\hat{p}_i(c)\log(p_i(c)) + (1 - \hat{p}_i(c))\log(1 - p_i(c))\right].$$

3. The method of claim 1, wherein for a positive match prediction of a character, the confidence loss is penalized according to a confidence score of the class of the character; and for a negative match prediction of a character, the confidence loss is penalized according to a softmax loss over confidences of multiple classes in the equation below:

$$L_{conf}(x, c) = -\sum_{i\in Pos}^{N} x_{ij}^{p}\log(\hat{c}_i^{p}) - \sum_{i\in Neg}\log(\hat{c}_i^{o}) \quad \text{where} \quad \hat{c}_i^{p} = \frac{\exp(c_i^{p})}{\sum_p \exp(c_i^{p})}$$

where N is a number of matched default boxes.

4. The method of claim 1, wherein the detecting step and the recognizing step are performed on each of multiple images from adjacent frames in a video about the vehicle, and the method further comprising, for each character position:

comparing characters from that position on the multiple images with each other;

choosing a character which occurs most often in the comparison as a recognized character for that position.

5. The method of claim 1, wherein the recognized license plate number is a two-line license plate number.

6. The method of claim 1, wherein the neural network predicts 35 classes, including a digit "0"-"9" and a letter "A"-"Z", for a character, wherein the letter "O" and the digit "0" is seen as one class.

7. The method of claim 1, further comprising, before the detecting step:

detecting the vehicle on a photo or a video frame about the vehicle; and cropping a region including the detected vehicle from the photo or the video frame as the image.

8. A device for recognizing a license plate number on an image, comprising:

a processor; and a memory, having stored instructions that when executed by the processor cause the device to perform the method of claim 1.

9. A non-transitory machine-readable medium, having stored thereon instructions, that when executed on a device cause the device to perform the method of claim 1.

* * * * *